US012593375B2

(12) United States Patent
Knight

(10) Patent No.: US 12,593,375 B2
(45) Date of Patent: Mar. 31, 2026

(54) METHOD OF DETECTING STATUS OF USER OUTSIDE VEHICLE, SYSTEM, STORAGE MEDIUM AND VEHICLE THEREOF

(71) Applicant: SUBARU CORPORATION, Tokyo (JP)

(72) Inventor: Edgar Knight, Lafayette, IN (US)

(73) Assignee: SUBARU CORPORATION, Tokyo (JP)

( * ) Notice: Subject to any disclaimer, the term of this patent is extended or adjusted under 35 U.S.C. 154(b) by 372 days.

(21) Appl. No.: 18/366,261

(22) Filed: Aug. 7, 2023

(65) Prior Publication Data
US 2025/0056670 A1 Feb. 13, 2025

(51) Int. Cl.
*H04W 76/50* (2018.01)
*H04W 64/00* (2009.01)

(52) U.S. Cl.
CPC ......... *H04W 76/50* (2018.02); *H04W 64/003* (2013.01)

(58) Field of Classification Search
CPC ....... H04W 76/10; H04W 76/50; H04W 4/90; H04W 4/48; H04W 4/80; H04W 92/18; H04W 76/27; H04W 76/14; H04W 4/44; H04W 12/61; G06Q 10/063114; G06Q 10/1093; G06Q 10/06311
See application file for complete search history.

(56) References Cited

U.S. PATENT DOCUMENTS 10,204,496 B2 * 2/2019 Miller, II ......... G08B 13/19602
2003/0174063 A1 * 9/2003 Basir .................... B60N 2/0035
73/1.01

2007/0135116 A1 * 6/2007 Chen ........................ H04W 4/90
455/422.1
2007/0160024 A1 * 7/2007 Jung ........................ H04L 67/75
370/338
2017/0144595 A1 * 5/2017 Rovinsky ............... G08B 21/24
2017/0232895 A1 * 8/2017 Sines ................... G08B 25/016
348/148
2020/0141745 A1 * 5/2020 Van Latum ............. B60C 23/20
2021/0268990 A1 * 9/2021 Dodson .................. B60K 35/60
2022/0082396 A1 * 3/2022 Van Latum .............. G08G 1/20
2022/0097636 A1 * 3/2022 Beach .................. B60N 2/0026
(Continued)

FOREIGN PATENT DOCUMENTS

JP 2005-044060 A 2/2005

*Primary Examiner* — Jung Liu
(74) *Attorney, Agent, or Firm* — Rimon P.C.

(57) ABSTRACT

A system detects a status of a user outside a vehicle. The system includes a wireless communication interface to communicate with a portable communication device to be carried by the user; a time managing unit, one or more processors coupled with the wireless communication interface and the time managing unit. and a memory couple with the one or more processors. The memory stores data and program instructions used by the one or more processors. The one or more processors are configured to execute instructions stored in the memory to establish a wireless connection between a portable communication device to be carried by a user and a base station mounted in a vehicle; and determine a status of the user away from the vehicle via the wireless connection, and if the status includes an emergency of the user, cause the base station of the vehicle to transmit an emergency signal.

18 Claims, 6 Drawing Sheets

(56)                 References Cited

U.S. PATENT DOCUMENTS

| | | | |
|---|---|---|---|
| 2022/0171599 A1* | 6/2022 | Krispin | G08B 5/004 |
| 2023/0060762 A1* | 3/2023 | Levy | B60Q 1/508 |
| 2023/0073610 A1* | 3/2023 | Sharma | H04L 51/02 |
| 2023/0171846 A1* | 6/2023 | Cheng | H04W 76/10 |
| | | | 455/404.1 |
| 2023/0186194 A1* | 6/2023 | Robb | G06Q 10/063114 |
| | | | 705/7.15 |
| 2024/0005772 A1* | 1/2024 | Delaney | G08B 21/18 |
| 2024/0292201 A1* | 8/2024 | Katz | H04M 3/5116 |
| 2024/0381396 A1* | 11/2024 | Kang | H04W 72/23 |
| 2024/0406693 A1* | 12/2024 | Veloso | G07C 5/008 |
| 2024/0425070 A1* | 12/2024 | Higgins | B60W 50/14 |

* cited by examiner

METHOD OF DETECTING STATUS OF USER OUTSIDE VEHICLE, SYSTEM, STORAGE MEDIUM AND VEHICLE THEREOF

FIELD

The present disclosure relates to methods and systems of detecting a status of a user outside a vehicle.

BACKGROUND

Various automotive safety systems have been and are still being developed to further increase the safety of driving, which has allowed the mobility range out of their cars of the drivers to be expanded.

Indeed, methods are known to detect an emergency such as a car accident, a climbing accident, and an abnormal accident in a home and transmit the information on them to designated addresses.

(Japanese Unexamined Patent Application Publication No. 2005-44060A).

Today, more and more outdoor lovers are driving cars to enjoy new experiences in nature and out-of-the-ordinary life. The outdoor activities the outdoor lovers have once they leave their cars are happy experiences, but at the same time they can be dangerous. In some cases, outdoor lovers may have an emergency while doing activities away from their cars. For example, they can get lost, get injured, or faint and cannot get back to their vehicles. Or they can lose their internet, telephone, or other communication means and can get disconnected from the security network providing security.

All the citations are each incorporated by reference in their entirety in:

Patent Document 1: Japanese Unexamined Patent Application Publication No. 2005-44060A

SUMMARY

Methods and systems according to the present disclosure provide a safe technology to support users even when they are away from their vehicles, thus expanding their mobility range outside their cars. An object of the present disclosure is to provide a method and a system by which the security of the activities of the users outside the vehicle can be improved.

One general aspect includes a method of detecting a status of a user moving outside a vehicle, the method comprising: establishing a wireless connection between a portable communication device to be carried by a user and a base station mounted in the vehicle; and determining a status of the user away from the vehicle via the wireless connection; and, if the user is in an emergency status, causing the base station of the vehicle to transmit an emergency signal.

The user may carry a portable communication device when leaving the vehicle. The portable communication device of the user is capable of wirelessly communicating with the vehicle. The portable communication device of the user may include a wireless communication unit therein or may be connected to a wireless communication device. The vehicle may include a wireless communication unit (also referred to as a base station). The wireless communication unit of the vehicle is capable of establishing a wireless communication with the portable communication device of the user.

\<User\>

As used herein, the term "user" generally refers to a person, a plurality of persons, or a group of persons (hereinafter also referred to as "a person" in the singular form) who is related to the vehicle, i.e. who is/has been/can establish a wireless communication with the vehicle.

The user may be a driver of the vehicle, or a passenger of the vehicle. The user may have come to the parking lot in the vehicle and may leave the vehicle and be planning to return to the vehicle. The user may plan to do an activity outside or away from the vehicle.

The user may not necessarily have to come to the parking lot in the vehicle. In some embodiments, the user may be a person who gets in the vehicle at or near the parking lot, and leaves the vehicle for an activity and then returns to the vehicle. In some embodiments, the user may join a person after the person leaves the vehicle and may go back to the vehicle with or without the person. The user and the person who came in the vehicle may communicate with each other using their devices, to establish the communication with the user and the vehicle.

The user may drive a vehicle to a destination, park and leave the vehicle, and go away for outdoor activities. Examples of such activities done by the user include: hiking, mountain climbing, camping, trekking; bouldering, skiing, snowboarding, rafting, kayaking (river and sea), SUP (standup paddle boarding), fishing, diving, surfing, yachting, horseback riding, off-road biking/cycling, walking at night, etc.

\<Vehicle\>

Unless otherwise defined, the term "vehicle" used herein refers to a machine capable of transporting people, communicating with people (even though it cannot transport people), and/or accommodating people. Examples of the vehicle include, but are not limited to, motor vehicles (cars, trucks, buses, motorcycles), wagons, and bicycles.

In some embodiments, the vehicle may include a communication component, device, unit and/or circuit therein (hereinafter also referred to simply as a "communication unit"). The communication unit of the vehicle may be, or may be configured to, built in, integrated in, mounted in, or disposed in the vehicle. The communication unit is also referred to as "a base station mounted in a vehicle" in this Specification. The vehicle may include a plurality of communication units, each for a different communication protocol. For example, the vehicle may include a communication unit for communicating with the user or the communication device of the user (a "first communication unit"), and another communication unit for communicating with a network, e.g. a cell mobile data network (a "second communication unit"). The adjectives such as "first" and "second" are merely examples to distinguish the two items, and may be expressed in an opposite manner "second" and "first" or in another manner.

In some embodiments, the vehicle may include one or more onboard computers. The onboard computer may execute or control the operation of the communication unit to communicate with a portable device of the user.

A system of one or more computers may be configured to perform particular operations or actions by virtue of having software, firmware, hardware, or a combination of them installed in the system so as to cause the system to perform the operations or actions. One or more computer programs may be configured to perform particular operations or actions by virtue of including instructions that, when executed by the one or more computers, cause the vehicle to perform the actions.

An onboard computer may include: a processor; a non-transitory storage medium storing computer code which may be accessed and executed by the processor; and a communication unit which enables the vehicle to communicate with the user and/or send and receive data via a wireless network (thereby making the vehicle a "connected vehicle").

In some embodiments, the data from the user received by the communication unit may include: location data, trajectory data (the path that the user has taken), health metrics of the user, a signal that the user has left the communication area from the vehicle, activity data, the destination setting information, etc. The data received or gathered by the processor may be stored in the storage or the memory.

The onboard computer may include one or more electronic control units ("ECU").

In some embodiments, the vehicle may stay or not move in one location such as a parking place while the user does his or her own activity outside or away from the vehicle. Accordingly, the vehicle can, for example, serve as a stationary point to be easily found for emergency contacts and services. For example, the vehicle can serve as a safe starting point for emergency services to fan out from and/or to begin their search to locate the missing user from.

In some embodiments, the vehicle may move or be in a moving state while the user is doing his or her activities outside the vehicle. Still, the "base station mounted in a vehicle" may function as a base station for the communication with the user and/or the communication with a communication network.

The terms expressed by combining "parking" and "lot"/ "position"/"location"/"point", and the like, and optionally with "initial"/"original" at the beginning such as "parking position", "parking location", "initial position", "initial point", "initial parking position" and the like used herein generally refer to the location where the vehicle is parked while the user does his or her activities outside the vehicle, and are used interchangeably unless specified otherwise.

<User's Portable Communication Device>

The term "portable communication device" used herein generally refers to a device that can communicate with the vehicle and that the user can carry. The portable communication device may have a communication component, device, and/or circuit in it or may be connected to a communication device, to communicate with the vehicle.

The portable communication device may be carried by the user. It can be carried by the user while the user is doing an activity outside or away from the vehicle. Such a device can be carried in a pocket, backpack, cap/hat, clothing, shoes carried by the user, and/or can be attached to the user via a belt, bag, strap on the neck, waist, wrist, arm, hip, leg, etc. Examples of the portable device of the user include, but are not limited to, a cellphone, a smartphone, a smart device, a smart watch and the like.

The expressions such as "communicating with the user" and the like used herein mean communicating with the communication device carried by the user, or to notify the user.

<Wireless Communication>

The wireless connection may be a radio frequency wireless telecommunication. The wireless connection may use a Vehicle-to-Pedestrian (V2P) protocol. The wireless connection may be established between the user or the portable device of the user and the vehicle or the communication unit of the vehicle. The wireless connection may be established between the user and the self-propelled device such a drone.

The user's portable communication device may inform or report to the user when the communication with the vehicle has been lost or interrupted. The device may alert the user to the loss of or interruption in the communication with the vehicle. If the loss of or interruption in the communication with the vehicle ends, e.g. when the user comes back in the communication with the vehicle, the portable communication device may inform the user thereof. The portable communication device may have a map which displays the current location of the user. The portable communication device may provide a locational relationship between the current location and another location, such as the location where the communication with the vehicle was previously lost or interrupted, the location of the vehicle, and the like.

<Designated Time>

The use may designate a time (herein also referred to as "designated time"). The term "designated time" used herein generally refers to a period of time or a point of time in which or by which the user is supposed or expected to return to the vehicle or to turn off the time function near/at/in the vehicle. In some embodiments, a "point of time" may be designated when a timer is used, such as 19:00, sunset time, and the like. In some embodiments, a "period of time" may be designated when an alarm is used, such as 8 hours, 20 hours, and the like.

The time may be designated by the user.

The time may be automatically designated, e.g. on the basis of the past record, the user's past preference, other types of records and preferences, or the like. In some embodiments, the user may choose, select or admit one of automatically options of "designated times", to finally designate the time to return by.

The user may remotely change the designated time that was once set, and set a new designated time.

The user may cancel the designated time when the user has returned to the vehicle. The designated time, record of changes in the designated time made by the user, other information related to the designated time and the like may be stored in the vehicle. The vehicle may detect or confirm the return of the user and cancel the designated time.

The user may remotely cancel or request to cancel the designated time before returning to the vehicle. In such a case, a safe return of the user to the vehicle may not be secured. In some embodiments, the status of the user at the time of cancellation may be recorded by the vehicle. Examples of the status may include, but are not limited to, the point of time, the location of the user, the distance of the user from the vehicle, and the like.

A timer may be started at a timing which may be set by the user, or predetermined by the vehicle. The timer may be started, as non-limiting examples, when the user has left the vehicle, when the user has started the timer, and when the wireless connection with user's device has been lost. The timer may be started upon or by another input.

In some embodiments, the status of the user may be determined by other conditions than the time. An "emergency" status can be determined by one or more of predetermined conditions including, but not limited to:

if the wireless connection is lost (the status of the user may be also determined to be "lost");

if the location of the user or the number of steps (or the data from the pedometer) does not change over a certain (predetermined or actively adjusted) period of time;

if one or a plurality of the health metrics of the user when the user returns to the communication range (coverage) by the vehicle is different from that or those when the user left the communication coverage, by a certain threshold;

if one or a plurality of the health metrics of the user when the user returns to the communication coverage by the vehicle are below a certain threshold.

<Status of User>

The "status of the user" may be whether the communication between the user and the vehicle can be established. If the user-vehicle communication is not established, it may mean that the user is outside of the range or coverage of the communication. In some embodiments, it may mean that the user is having an emergency. In some embodiments, a timer or an alarm clock may be started when the communication that was once established is lost. If the user has not returned to the car by the designated time, the vehicle can send, for example, an emergency signal. The "status" may include a time stamp.

A typical example of the "status of the user" may be whether or not an emergency. Other examples of "statuses of the user" includes, but are not limited to, the location of the user and health metrics or health conditions of the user.

The wireless communication between the user and the vehicle may be used to locate the user, calculate the distance and direction to the user's location, and the like. The location of the user may be shown on a map of the portable communication device of the user and/or a map of the vehicle.

The health metrics of the user may be acquired by a portable device such as a smart watch, or a wearable device.

Examples of the health metrics include, but are not limited to, various vital signs of the user, such as hydration, calories, blood pressure, blood sugar, blood glucose, insulin, body temperature, heat, heat flux, heart rate, weight, sleep, number of steps, velocity, acceleration, vitamin levels, respiratory rate, heart sound, breathing sound, movement speed, skin moisture, sweat detection, sweat composition, nerve firings of the user, and the like. The health metric may be related to calories burned, a rate of calorie burn, an acceleration of calorie burn, a deceleration of calorie burn, an amount of power expended, or an amount of work performed. The accuracy of a health metric of a user may be improved by taking into consideration the type of activity of the user in calculation of the health metric.

The vehicle may communicate with the user's portable communication device multiple times during an activity of the user away from the vehicle. In some embodiments, the communication may be done constantly. For example, the communication is substantially always established during the activity. In some embodiments, the communication may be done periodically. For example, the communication is done at intervals of, for example, 5 min, 10 min, 15 min, 30 min, 1 hour, and the like.

<Wireless Repeater>

The wireless connection may be established by an intermediate communication device which connects the portable device of the user to the base station mounted in a vehicle. The wireless repeater may not have to be carried by the user. The wireless repeater may work remotely with at least one of, either of, or both of the portable devices of the user and the vehicle.

Examples of such a wireless repeater include, but are not limited to, a self-propelled device such as a drone, a movable device, and a stationary device. The wireless repeater may be a unit or component built in such a device or such a drone.

Hereinafter a "drone" may be used as an example of a self-propelled device which is, in turn, an example of the wireless repeater. But unless indicated as meaning otherwise, the term "drone" used herein should not be construed as only meaning what is called "drone" in the conventional wisdom, and should instead be construed as an exemplary expression the meaning of which includes self-propelled communication devices in general, which can possibly be used for the embodiments of the present disclosure and the claimed inventions.

The wireless connection via a wireless repeater therebetween may always be established, or may not always be established during the user's activity outside the vehicle. The wireless connection may be established with time intervals.

A drone may be positioned so as to be able to communicate with both the portable device of the user and the vehicle simultaneously or at the same time.

If the drone cannot connect the portable device of the user and the vehicle simultaneously but is connectable to either one of the two at a timing, the drone may communicate with the one of the two and then move closer to the second of the two to communicate with the second one. The drone can repeat this operation multiple times or, in other words, go back and forth multiple times between the two communication areas.

The self-propelled wireless repeater such as a drone may come back to the vehicle for charging of electric energy or other types of energy from the vehicle. The vehicle may automatically or autonomously start its engine or motor to generate the energy for the charging. The charged drone may take off again for communications with the user and/or the vehicle.

<Input of Destination Etc.>

The user may input a plan of the activity that the user is going to do, before leaving the vehicle, or during the activity while the user-vehicle communication is established. The activity plan may include, but is not limited to: a destination, a trajectory or path to and/or from the destination, a trajectory or path of the movement of the activity, a type of the activity, a period of time of the activity, and the like.

<Recording of Data of User's Activity>

The input data associated with the user's activity may be stored in a memory, a storage or the like in the vehicle, or alternatively or additionally a server or the portable device of the user, which are connected or are configured to be connected to the vehicle.

Such recorded data of the user during the activity may be important or useful for a rescue of the user. For example, if a rescue team is informed of the last known location of the user, this may allow the rescue team to narrow down the area to be searched. As a result, for example, the time needed to find and save the user in an emergency would be shortened. For example, the last piece of health metrics (or health condition) or change in the health metrics during the activity may allow the rescue team to select the appropriate means for the search.

By referring to such data or information, the rescue team can select the appropriate approach to the user option such as on the ground, by helicopter, by boat, and the like, and/or select appropriate equipment to bring such as medical apparatuses/drugs, dogs, camera, drones, and the like. Accordingly, such information can at the end increase the safety of the user who does his or her activities outside or away from the vehicle.

<Recipient of Emergency Signal>

If it is determined that the user is in an emergency state, an emergency call should be transmitted or sent to a predetermined recipient. Examples of the recipient include: an emergency call number (e.g. 911 in the USA and Canada, 110 or 119 in Japan), a family member, a friend, any other predetermined person or office, and the like.

In some embodiments, the recipient of the emergency call may be selected by the vehicle. In some embodiments, if such a recipient is not predetermined, the vehicle should find a recipient for the emergency call. In some embodiments, even if a recipient is predetermined, the vehicle may find a better solution for selecting a recipient for the emergency call than selecting a predetermined recipient. For example, the vehicle may select a recipient who is the easiest/quickest available among a list of the recipients. For example, the vehicle may select a recipient that is more easily or more quickly available than the predetermined recipient or a recipient that was once selected but was not connected easily or quickly.

<Vehicle Moving to a Network-Available Area>

The vehicle may be outside of a communication network that should be used for the signal transmission. The vehicle may automatically or autonomously move to within a cell of another network, where an emergency signal can be transmitted.

In some embodiments, the vehicle may record the route on the way to the initial point where the user left the car. The vehicle may record such information of communication networks that have been available in association with the geographic points on the route the vehicle came on the way to the initial point. The vehicle may use such recorded information to find a location where one or more of those recorded networks is available on the route it came.

In some embodiments, the vehicle may have information on availability of communication networks in the memory in advance. Even without having an actual communication network, the vehicle may locate its initial point in the map, by using, for example, GPS. The vehicle may find a location where one or more of those recorded networks is available on the map and then find a route to the location found. The nearest location or the location which the vehicle can reach fastest may be selected if plural locations are found.

<Left-Behind Device>

In some embodiments, the vehicle may leave a communication device when it leaves the parking position. Such a device is also referred to as "left-behind device" or "parking sitter device" interchangeably in this Specification. The present disclosure provides such a "left-behind device. The left-behind device may be able to communicate with the user and/or with the vehicle which left the original location. The left-behind device may be able to establish a wireless communication with the user and/or with the vehicle.

The left-behind device may be accommodated in the vehicle or be configured to be carried by the vehicle. The left-behind device may be detached from the vehicle and disposed at or near the initial parking position, when the vehicle leaves. In some embodiments, the left-behind device may remain at the "parking position" after the vehicle left.

The left-behind device may be able to communicate with the user when the user is back within the communication range of the left-behind device or comes back to the initial parking position. The user can recognize the left-behind device when the user is back, visually and/or via the wireless communication. The presence of the left-behind device provides mental and/or practical security to the user during the time while the vehicle cannot be found at the initial parking position.

In some embodiments, the left-behind device may automatically or autonomously move. The left-behind device may be a small car. The left-behind device may move around for example in the parking space to find a better position such as a position better for the wireless communication of the user who may come back, a position where it would not disturb other vehicles in the parking space, and the like.

In some embodiments the left-behind device may be, or be built in, a self-propelled device such as a drone. The drone may leave the initial parking position and search for the user and/or the vehicle. For example, a time may be preset. When the preset time is reached, the drone may start off to search for the user and/or the vehicle. For example, the drone may find the user, communicate with the user and/or acquire the current status of the user.

In some embodiments, the drone may then fly to the vehicle and re-establish the connection with the vehicle which may have remained at or be away from the initial parking position. The drone can transmit to the vehicle information including the user's updated status such as whether or not the user is in an emergency state, the health metrics and the like. The vehicle can then further transmit the obtained information to a network.

The drone may go back and forth between the user and the vehicle to bridge the communication therebetween. For example, useful information obtained at/by the vehicle or the communication network may be carried by the drone and be provided to the user in trouble. As a result, for example, the time needed to rescue the user may be shortened. For example, the security for the user may be improved.

The drone may fly to a location where a network is available. The drone may directly transmit the current status of the user to the network. The drone may fly to a location where charging is possible. The drone may fly back and forth between the user and the network coverage area, and/or among the user, the vehicle and the network.

<Vehicle Returning to a Network-Available Area>

The vehicle can automatically, autonomously, or by another driver, return to the initial parking point. The vehicle may have made an emergency call. The vehicle may not have established a communication with a recipient for the emergency call. The timing of the vehicle's return to the initial parking point may be, but is not limited to, when an emergency call to a recipient has been effectuated, when a time to return to the initial parking point has been reached, and the like. For example, the vehicle's return to the initial parking point can prevent a situation where a vehicle cannot communicate with the user for a long period of time.

BRIEF DESCRIPTION OF THE DRAWINGS

Some embodiments and examples of the present disclosure will now be discussed in detail by referring to the following figures. The embodiments and examples are illustrated by way of examples only, and should not be interpreted as limiting with the figures of the accompanying drawings.

SYSTEM CONFIGURATION

Figure 1:
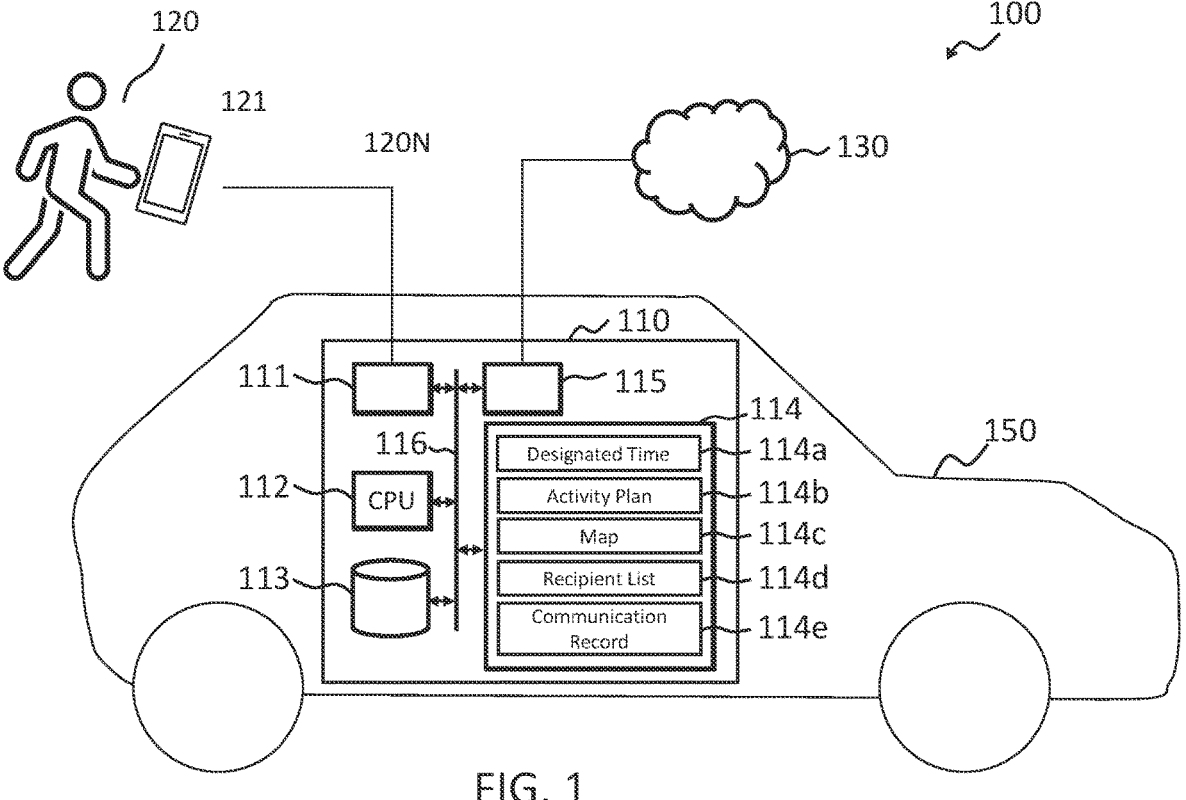
FIG. 1 depicts a block diagram illustrating an operating environment for a vehicle having an emergency support system according to an embodiment.

FIG. 1 depicts a block diagram illustrating an operating environment 100 for a vehicle 150 having an emergency support system 110. In some embodiments, the operating environment may include: the vehicle 150 having an emergency support system 110; a portable communication device 121 to be carried by a user 120; and a network 130 to which the vehicle can send an emergency signal.

A wireless connection 120N between the portable device of the user 121 and the emergency support system 11 of the vehicle 150 may be established. Examples of the wireless connection 120N include, but are not limited to, a radio frequency wireless telecommunication, and a Vehicle-to-Pedestrian (V2P) protocol.

The user 120 may set or input information of the activity, such as when to return, the type of activity, the trajectory or the path to be taken, the location of the destination of the path, and the like, via the portable communication device 121 or directly into the emergency support system 110 while being in the vehicle 150. Such information may be input into the system 110 preferably before the user 120 starts the activity. In some embodiments, such information may be changed or updated by the user 120 or automatically via the portable communication device 121, while the portable communication device 121 is within the communication range 120N with the emergency support system 110 of the vehicle 150.

The portable communication device 121 may send signals to the emergency support system 110 regularly or irregularly while within the communication range 120N. In some embodiments, the portable communication device 121 may send a signal to the vehicle 150, when it detects that the user 120 is about to go outside of the communication range 120N. In some embodiments, the last signal from the portable communication device 121 may be saved as the last contact from the portable communication device 121 before it left the communication range 120N.

In some embodiments, the emergency support system 110 may include a first wireless communication unit 111; a second wireless communication unit 115; a processor 112; a storage 113; and a memory 114. In the example illustrated in FIG. 1, these components are communicatively coupled to a buss 116 and are thus communicative with each other via the bus 116.

The processor 112 may include an arithmetic logic unit, a microprocessor, a general-purpose controller, a single core or multicore processor, or multiple processors for parallel computations. The processor 112 may include or a part of an electronic control unit ("ECU") of the vehicle 150. Although FIG. 1 includes a single processor 112, multiple processors may be included.

The storage 113 may be a non-transitory storage medium that stores programs and data for providing the functionality described herein. The storage 113 may be, but is not limited to, a dynamic random access memory (DRAM) device, a static random access memory (SRAM) device, flash memory, or some other memory devices. In some embodiments, the storage 113 also includes a non-volatile memory or similar permanent storage device or media. Examples of such a storage includes, but are not limited to, a hard disk drive, a floppy disk drive, a CD-ROM device, a DVD-ROM device, a DVD-RAM device, a DVD-RW device, a flash memory device, or some other mass storage device for storing information on a more permanent basis.

The memory 114 may store instructions or data that may be executed by the processor 112. The instructions or data may include code for performing the techniques described herein. The processor 112 may move the programs and data stored in the storage 113 to the memory 114 and execute and/or use them. The memory 114 may be, but is not limited to, a dynamic random access memory (DRAM) device, a static random access memory (SRAM) device, flash memory, or some other memory device. In some embodiments, the memory 114 also includes a non-volatile memory or similar permanent storage device or media. Examples of such a memory includes, but are not limited to, a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 1, the memory 114 may store one or more of the following elements: a designated time 114a or time to return designated by the user 120; an activity plan 114b including the information of the activity to be performed by the user 120; a map 114c including geological information of the region where the activity is being performed or the route; a recipient list 114d including a list of recipients such as a rescue team and persons or entities to receive the emergency signal with or without priority; and a communication record 114e including all the information received and/or sent to the user 120 and the network 130.

In some embodiments, the emergency support system 110 may include a clock function. The clock function may be configured by the processor 112, the memory 114, software, and/or another component, and/or a combination of multiple components in the system 110. The clock may be a real time clock (RTC) or a hardware clock. The clock may be a system clock which is managed by an operating system.

The first wireless communication unit 111 is configured to receive information from the portable device 121 of the user 120, via the established wireless connection 120N. The first wireless communication unit 111 may also be configured to send information to the portable device 121 of the user 120.

The second wireless communication unit 115 is configured to send information including an emergency signal to one or more recipients via the wireless network 130. The second wireless communication unit 115 may also be configured to receive information from the wireless network 130.

The network 130 may include a mobile data network. Examples of the network 130 include, but are not limited to: third-generation (3G), fourth-generation (4G), fifth-generation (5G), sixth-generation (6G), long-term evolution (LTE), Voice-over-LTE ("VOLTE"), IEEE 802.11 wireless networks, satellite internet access, or any other mobile data network or combination of mobile data networks.

EXAMPLES

Referring to FIGS. 2 to 6, some examples will be explained below. Portable communication devices carried by the user and the emergency system of the vehicles are omitted for the sake of simplicity. Expressions "communication between the user and the vehicle" and the like refer to the "communication between the portable communication device of the user and the emergency support system of the vehicle".

Example 1

Figure 2:
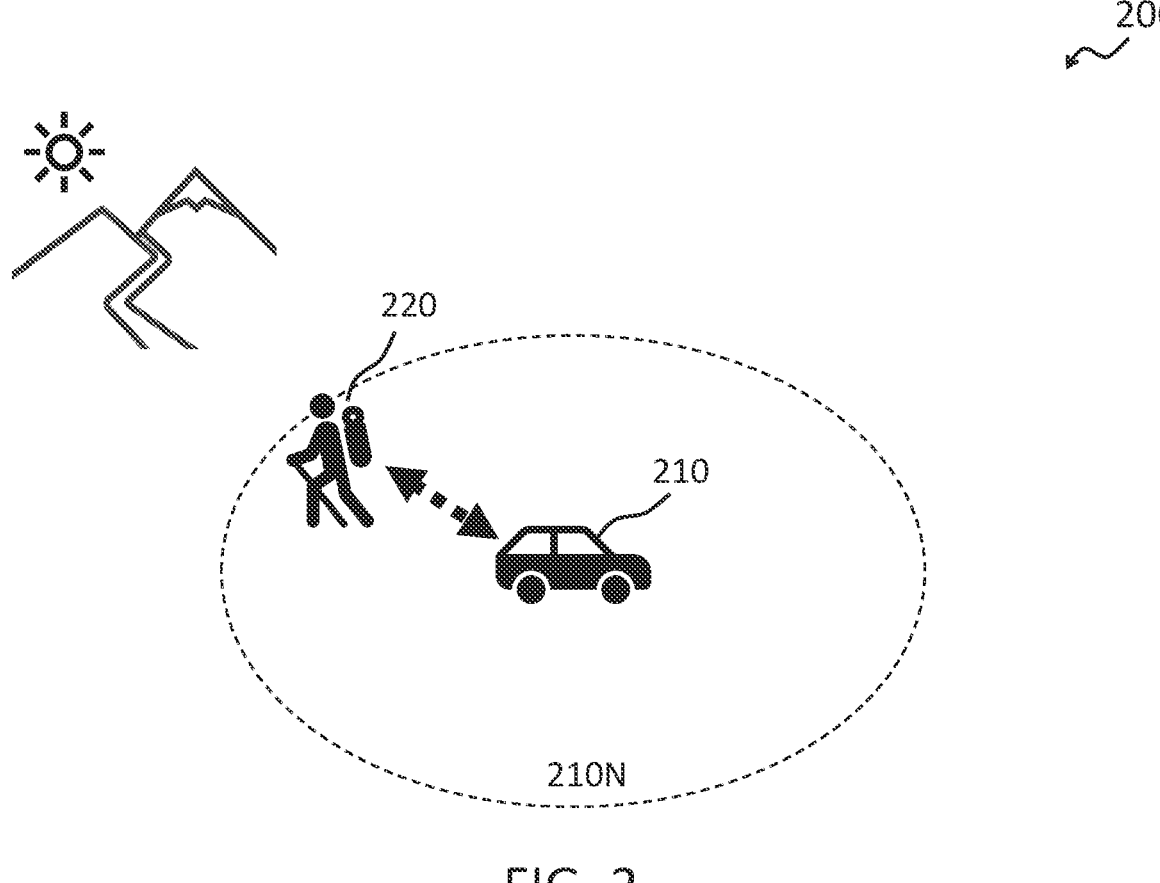
FIG. 2 illustrates an operating environment according to an example.

FIG. 2 illustrates an operating environment 200 where a user 220 left the vehicle 210 after having established the wireless connection. The user 220 has input necessary information such as the type of activity the user 220 is doing, where the user 220 is headed, when the user 220 is supposed to return to the vehicle 210 and the like before leaving the vehicle 210. In FIG. 2, the user 220 still remains within the communication coverage 210N of the vehicle 210. In such a case, the portable communication device (not shown in the figure) can send to the vehicle 210 information including the status of the user 220 such as location and health metrics of the user 220, which have been gathered by the portable communication device.

If the user 220 has not returned to the vehicle 210 or has stayed at one location longer than a threshold (for example, predetermined period of time), the vehicle 210 can send signals to the user 220 to ask whether or not the user 220 is in an emergency state. If the user 210 answers that the status is not an emergency, the vehicle 210 can store that information and keep watching the status of the user 210. If the user 210 answers that the status is an emergency or does not reply at all, the vehicle 210 may determine that the status of the user 220 is an emergency. The vehicle 220 can then send signals to a network (not shown).

Example 2

Figure 3:
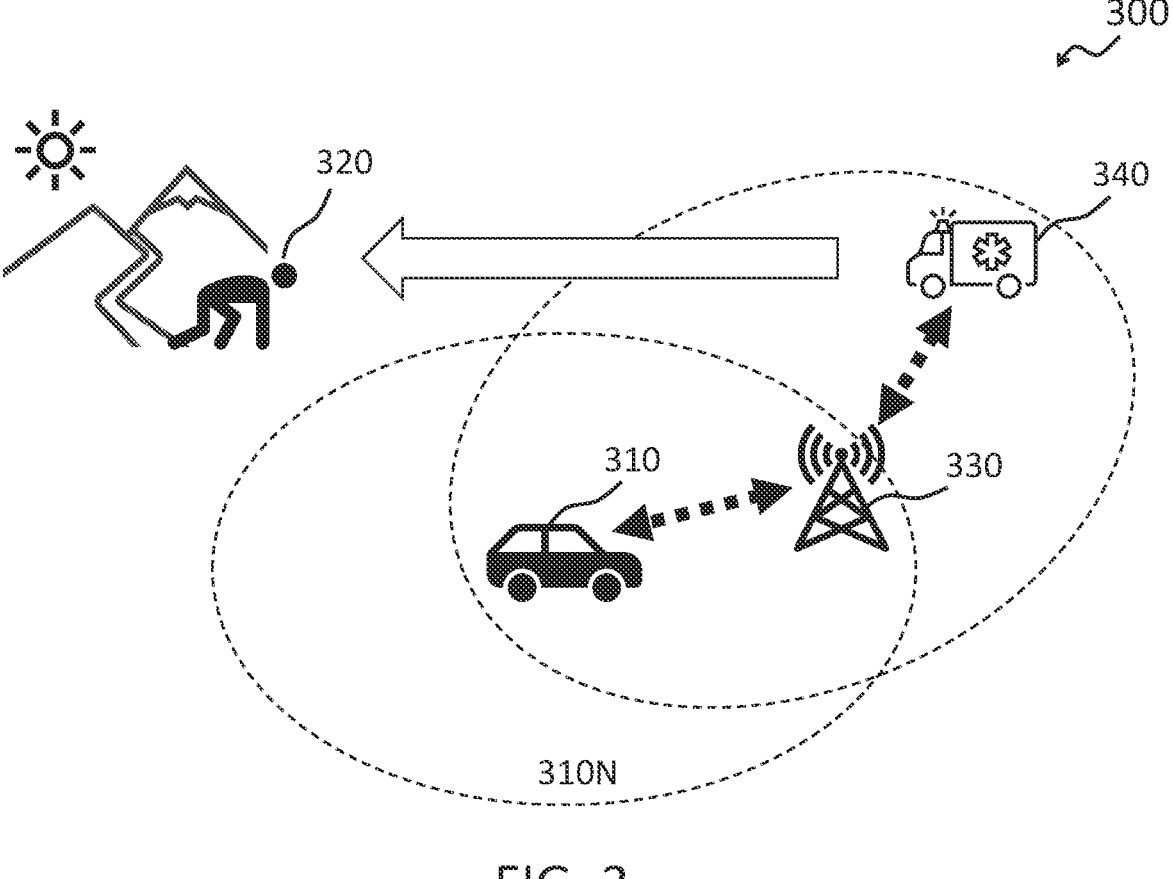
FIG. 3 illustrates an operating environment according to an example.

FIG. 3 illustrates an operating environment 300 where a user 320 has left the communication area 310N covered from a vehicle 310. FIG. 3 depicts a situation where the user 320 is in an emergency state. The user 320 has not been able to come back to the vehicle 310 or at least the communication area 310N by a pre-set return time. As a result, the vehicle 310 has determined that the user 320 is in an emergency state, and sends the information thereof to a rescue team 340 via a network 330 available at the vehicle 310.

The rescue team 340 receives the information that the user 320 is an emergency state, and related information including, e.g. the type of activity the user 320 has been doing, where the user 320 was headed, when the user 320 was supposed to return the vehicle 210, the start time of the activity, the location of the user 320 which was last communicated, and health metrics of the user 320. On the basis of the received information the rescue team 340 can make appropriate preparation by adapting the rescue equipment, the medical equipment, the skills needed for the rescue of the user 320, the size of the team, the type of the rescue vehicle, etc. The rescue team 340 can quickly depart, reach the activity area and rescue the user 320 in an emergency.

Example 3

Figure 4:
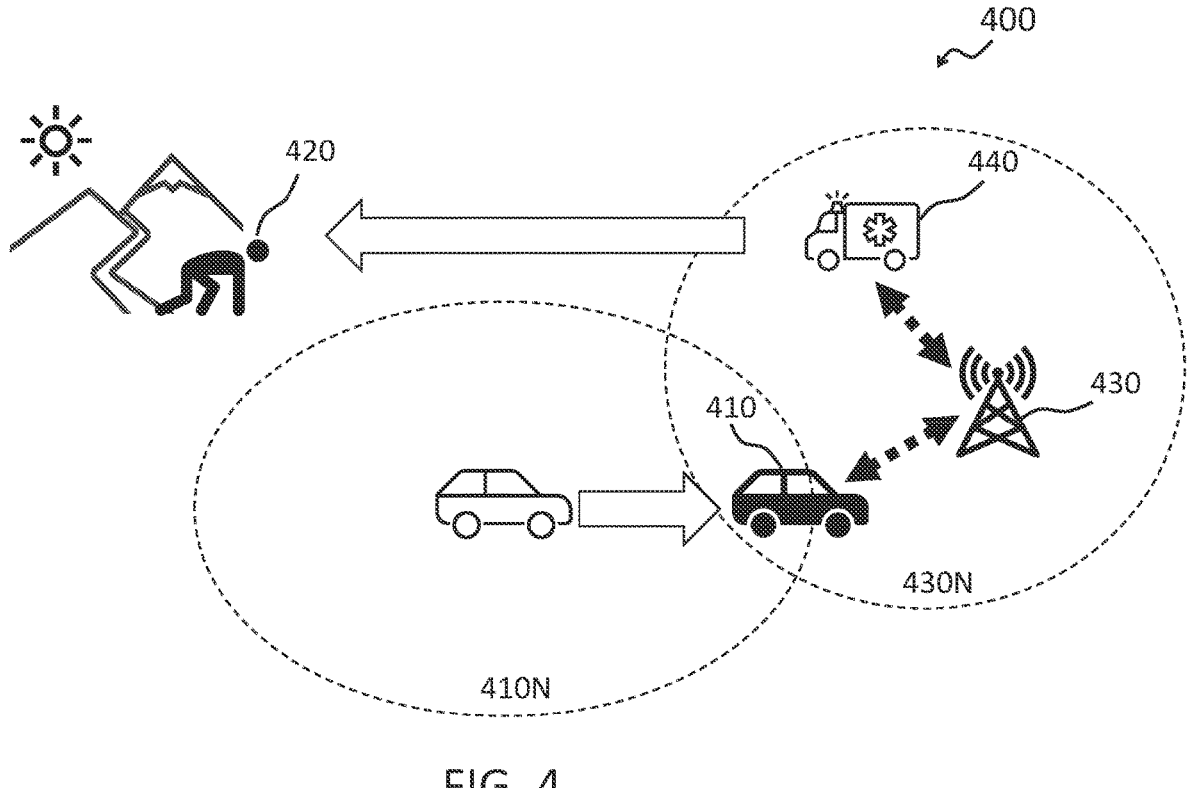
FIG. 4 illustrates an operating environment according to an example.

FIG. 4 illustrates an operating environment 400 where a user 420 has left the communication area 410N covered from a vehicle 410 at the initial parking position. FIG. 4 depicts a situation where the user 420 is in an emergency state. The user 420 has not been able to come back to the vehicle 410 or at least the communication area 410N by a pre-set return time. As a result, the vehicle 410 has determined that the user 420 is in an emergency state. But from its parking position, the vehicle 410 has not found a network available via which to transmit an emergency signal.

In such a case, the vehicle 410 may automatically start its engine or motor and autonomously move to within a cell 430N of a network 430, where an emergency signal can be transmitted.

The vehicle 410 may have recorded the route on the way to the parking position where the user 420 left the vehicle 410. In some embodiments, the vehicle 410 may use such recorded information and find a location where one or more of those recorded networks is available on the route it came.

The vehicle 410 may have information of availability of communication networks in the memory in advance. Even without having an actual communication network, the vehicle may locate the parking position on the map, by using, for example, GPS. The vehicle 410 may find a location where one or more of those recorded networks is available on the map and then find a route to the location found. The nearest location or the location which the vehicle 410 can reach fastest may be selected if plural locations are found.

Once the vehicle 410 finds an available network 430 or reaches the coverage 430N, the vehicle 410 sends the information including the emergency signal and other related information related to the user 420 and the vehicle 410 to a rescue team 440 via a network 430.

The rescue team 440 receives the information that the user 420 is in an emergency, and related information. On the basis of the received information the rescue team 440 can make appropriate preparation. The rescue team 440 can quickly depart, reach the activity area and rescue the user 420 in an emergency state.

Example 4

Figure 5:
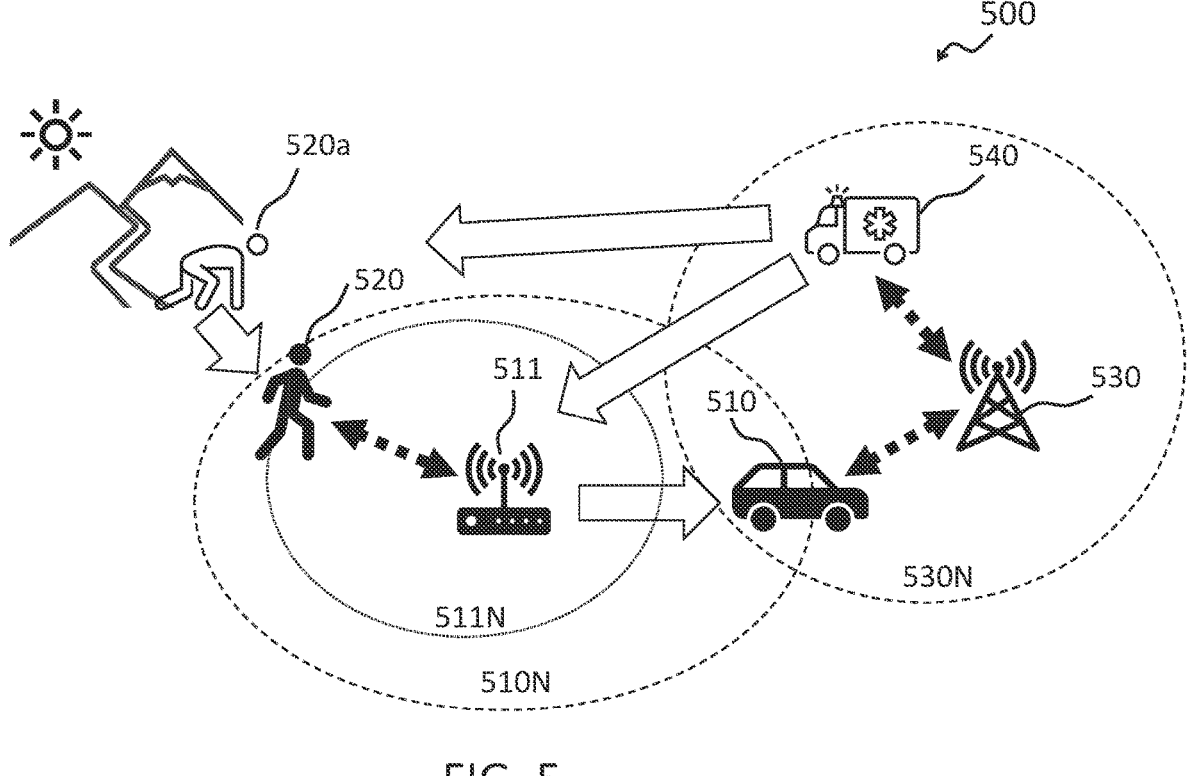
FIG. 5 illustrates an operating environment according to an example.

FIG. 5 illustrates an operating environment 500 where a user 520 has left the communication area 510N covered from a vehicle 510 (user 520a). FIG. 5 depicts a situation where the user 520a has not returned to the vehicle 510 or at least the communication area 510N by a pre-set return time. As a result, the vehicle 510 has determined that the user 520 is in an emergency state. But from its parking position, the vehicle 510 has not found a network available via which to transmit an emergency signal.

In such a case, the vehicle 510 may automatically start its engine or motor and autonomously move to within a cell 530N of a network 530, where an emergency signal can be transmitted.

In this Example, the vehicle 510 may have a left-behind device 511. The vehicle 510 may drop or detach the left-behind device 511 at the parking position when or before leaving for an available network area 530N.

The user 520 may return to the parking position late, after the designated time, or after the vehicle 510 left the initial parking position. The left-behind device 511 may be able to communicate with the user 520 or to establish a wireless connection with the user 520 when the user 520 comes within the communication range 511N of the left-behind device 511.

If the user 520 returns, the user 520 can recognize the left-behind device 511 at the initial parking position where the vehicle 510 was parked. The vehicle 510 may have left or is no longer there. The presence of the left-behind device 511 provides mental and/or practical security to the user during the time while the vehicle 510 cannot be found at the initial parking position.

The left-behind device 511 may record and store the information received from the user 520 including the latest information of the user 520. Such information may be useful for the rescue.

The rescue team 540 receives the information that the user 520 is an emergency state, and related information. On the basis of the received information the rescue team 540 can make appropriate preparation. The rescue team 540 can then quickly depart. The rescue team 540 can directly go to the possible activity area and search for the user in an emergency 520a. The rescue team 540 can alternatively stop by at the initial parking position of the vehicle 510 or to the left-behind device 511. The rescue team 540 may find that the user 510 has returned to the initial parking position. If the user 510 is there, the rescue team 540 may check the information that the left-behind device 511 gathered by then and utilize it for the treatment of the user 510. If the user 510 is not there, the rescue team 540 may further search for the user 510a still lost in an emergency state.

Example 5

Figure 6:
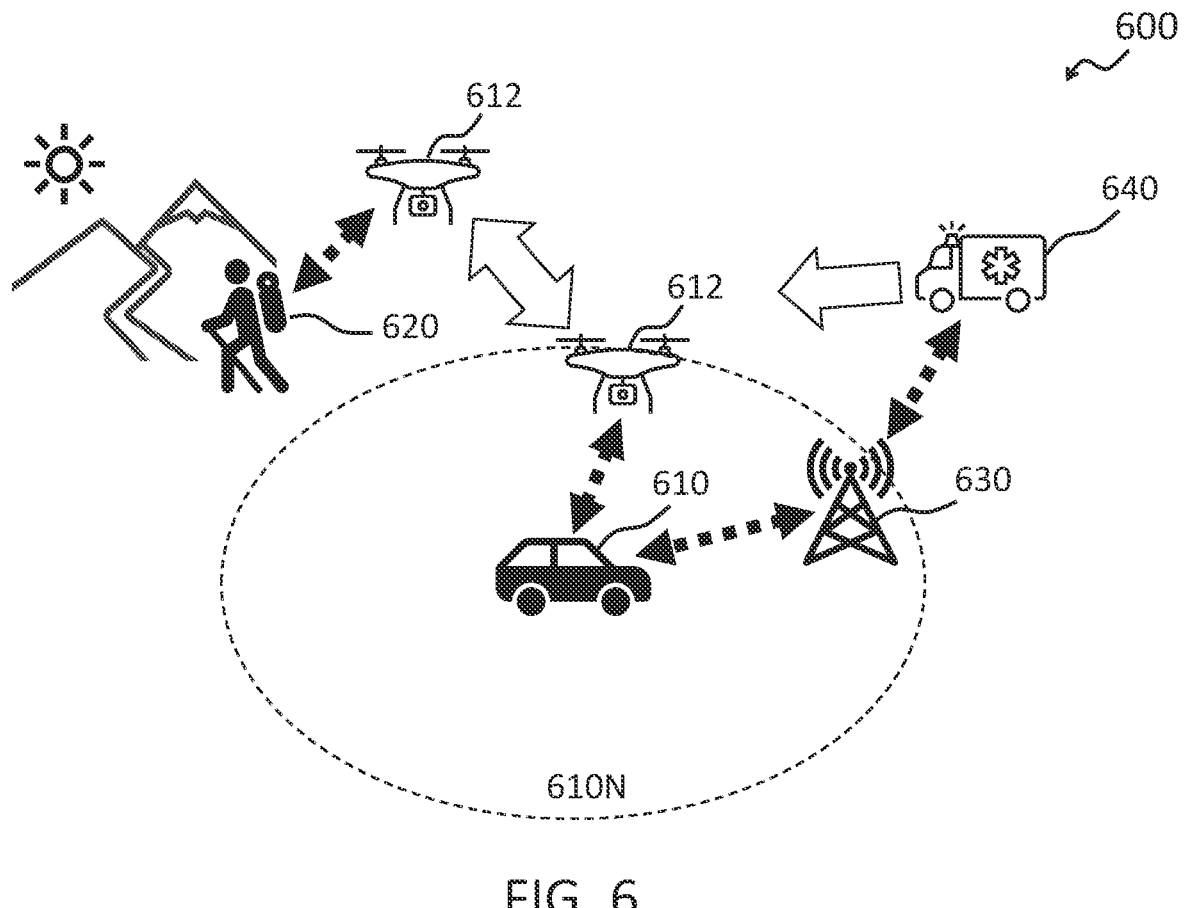
FIG. 6 illustrates an operating environment according to an example.

FIG. 6 illustrates an operating environment 600 where a user 620 has left the communication area 610N covered from a vehicle 610. The vehicle 610 includes a drone 612. The information related to the user 620 which has been gathered by the vehicle 610 may be shared with the drone 620. The drone 612 may be detached from the vehicle 612 and take off and look for the user 620 outside of the communication area 610N from the vehicle 610.

The drone 612 may take off when the user 620 has not returned by a preset time. The drone 612 may take off when a certain time has passed since the user 620 left the vehicle 610 or the communication area 610N. The timing for the drone 612 to take off may be set otherwise.

The drone 612 may estimate the current location of the user 620 based on the information input by the user 620 before leaving the vehicle 610, such as the destination, the path, the activity plan and the like.

If the drone 612 finds the user 620, the drone 612 can communicate with the user 620. The drone 612 may send signals to the user 620 to inform the user 620 of the drone 612 approaching. The drone 612 can establish a connection with the portable communication device (not illustrated) of the user 620 and therethrough obtain information related to the user 620. The user 620 can send signals or information to the drone 612. Such information may include the path taken by the user 620 so far, health metrics of the user 620, whether the user 620 is in an emergency state, messages from the user 620, and the like.

The drone 612 can also obtain information related to the user 620 by means other than the portable communication device of the user 620. The drone 612 can capture an image of the user 620, other information related to topography and climate around the user 620. Such images and information may be used to determine the status of the user 620, e.g. whether the user 620 is in an emergency state or continuing on the activity as planned.

The drone 612 may succeed in obtaining information related to the user 620 or may end up not having able to find the user 620, within a determined time frame or in accordance with a certain condition. Then the drone 612 flies back to the communication area 610N. The drone 612 then transmits the obtained information related to the user 620 to the vehicle 610.

The drone 612 can also land at the charging station (not illustrated) of the vehicle 610 to charge energy.

The vehicle 610 transmits the information related to the user 620 received from the drone 612 to a rescue team 640 via a network 630 available at the vehicle 610. Alternatively, if a network is not available, the vehicle 610 may automatically or autonomously move to or look for an available network (not illustrated). If the user 620 is in an emergency state, the rescue team 640 can quickly depart, reach the activity area and rescue the user 620.

The drone 612 can depart again for the user 620, and/or go back and forth between the user 620 and the vehicle 610. This allows the drone 612 to charge power for longer flights, provide the user 620 with useful information from the vehicle 610, and/or bring tools/foods from the vehicle 610. The rescue team 640 can provide information such as the estimated arrival time of the rescue team at the location of the user 620, what to do in the emergency state in which the user 620 currently is, and the like. Such information from the rescue team 640 can also be transmitted via the vehicle 610 and the drone 612 to the user 620.

The present disclosure further includes the following embodiments:

A001. A method of detecting a status of a user outside a vehicle, the method comprising:

establishing a wireless connection between (a portable communication device to be carried by) a user and (a base station mounted in) a vehicle;

determining a status of the user away from the vehicle via the wireless connection; and, if the status includes an emergency of the user, causing (the base station of) the vehicle to transmit an emergency signal.

B001. A system (or unit) for detecting a status of a user outside a vehicle, the system comprising:

a wireless communication interface to communicate a portable communication device to be carried by the user;

a time managing unit;

one or more processors coupled with the wireless communication interface and the time managing unit; and a memory couple with the one or more processors, the memory for storing data and program instructions used by the one or more processors, wherein the one or more processors are configured to execute instructions stored in the memory to:

establish a wireless connection between (a portable communication device to be carried by) a user and (a base station mounted in) a vehicle; and determine a status of the user away from the vehicle via the wireless connection; and, if the status includes an emergency of the user, cause (the base station of) the vehicle to transmit an emergency signal.

A011. The method or the system according to A001, B001, or any of the Embodiments, wherein the determining of the status of the user away from the vehicle via the wireless connection includes:

designating a time by which the user is expected to return to the vehicle; and if the user has not returned to the vehicle by or at the designated time, determining the status as an emergency of the user.

A011b. A method of detecting a status of a user outside a vehicle, the method comprising:

establishing a wireless connection between (a portable communication device of) a user and (a base station mounted in) a vehicle;

designating a time by which the user is expected to return to the vehicle; and when the designated time has passed, detecting whether the user has returned to the vehicle; and, if the user has not returned to the vehicle by/at the designated time, causing the vehicle to send an emergency signal.

A015. The method, or the system according to A011, A011b, B001, or any of the Embodiments, wherein the designating of the time includes designating the time by the user.

A016. The method or the system according to A011, B001, or any of the Embodiments, further comprising:

starting to count the designated time when the user has gone outside of a communication range of the base station of the vehicle or when the wireless communication between the user and the vehicle has been lost.

A021. The method or the system according to A011, B001, or any of the Embodiments, further comprising:

communicating with (the portable communication device of) the user; and acquiring the status of the user.

A022. The method or the system according to A021, or any of the Embodiments, wherein the status of the user to be acquired includes whether the communication can be established between the user and the vehicle.

A023. The method or the system according to A021 or A022, or any of the Embodiments, wherein the status of the user to be acquired includes at least one of a location of the user and a health condition of the user.

A025. The method or the system according to A021, or any of the Embodiments, further comprising: acquiring the status of the user at a plurality of timings.

A026. The method or the system according to A025, or any of the Embodiments, wherein the acquiring of the status of the user includes acquiring the status of the user constantly or periodically.

A031. The method or the system according to A021, or any of the Embodiments, wherein the communicating with (the portable communication device of) the user includes communicating with (the portable communication device of) the user via a wireless repeater, the wireless repeater being capable of communicating both with (the portable communication device of) the user and the vehicle.

A032. The method or the system according to A031, or any of the Embodiments, wherein the wireless repeater is or built in a self-propelled device or a drone.

A041. The method or the system according to any one of A031 to A033, or any of the Embodiments, further comprising:

recording the acquired status of the user.

A042. The method or the system according to A041, or any of the Embodiments, wherein the emergency signal includes at least a part of the recorded status of the user in the vehicle.

A051. The method or the system according to A001, B001, or any of the Embodiments, further comprising:

guiding the user to input a plan of an activity to be done by the user.

A052. The method or the system according to A051, or any of the Embodiments, further comprising:

recording the plan of the activity of the user.

A061. The method or the system according to A001, B001, or any of the Embodiments, further comprising:

providing a recipient of the emergency signal, and wherein the transmitting of the emergency signal includes transmitting the emergency signal to the recipient.

A071. The method or the system according to A001, B001, or any of the Embodiments, wherein the transmitting of the emergency signal includes: searching a usable communication network.

A072. The method or the system according to A001, B001, or any of the Embodiments, wherein the transmitting of the emergency signal includes: if no usable communication network is found, causing the vehicle to autonomously move from an initial position to a location where a usable (communication) network exists.

A073. The method or the system according to A072, or any of the Embodiments, wherein causing the vehicle to autonomously move from the initial position to a location where a usable communication network exists includes: leaving a device to be left behind at the initial position.

A074. The method or the system according to A073 or any of the Embodiments, wherein the device to be left behind is capable of communicating with (the portable communication device of) the user.

A075. The method or the system according to A073, A074 or any of the Embodiments, wherein the second communication device is capable of communicating with the vehicle.

A076. The method or the system according to A072 or any of the Embodiments, further comprising: after the emergency signal has been transmitted (or if the vehicle has not found a location where a usable communication network exists), causing the vehicle to return to the initial position.

C001. A computer program product or a software for detecting a status of a user outside a vehicle, comprising a program code executable by a processor to:

establish a wireless connection between (a portable communication device to be carried by) a user and (a base station mounted in) a vehicle;

determine a status of the user away from the vehicle via the wireless connection; and, if the status includes an emergency state of the user, cause (the base station of) the vehicle to transmit an emergency signal.

C011. The computer program product or a software for detecting a status of a user outside a vehicle, comprising a program code executable by a processor to execute any one of the methods according to any one of A001 to A076, or any of the Embodiments.

D001. A computer readable storage medium having a program code embodied therewith, the program code executable by a processor to:

establish a wireless connection between (a portable communication device to be carried by) a user and (a base station mounted in) a vehicle;

determine a status of the user away from the vehicle via the wireless connection; and, if the status includes an emergency state of the user, cause (the base station of) the vehicle to transmit an emergency signal.

D011. A computer readable storage medium having a program code embodied therewith, the program code executable by a processor to execute any one of the methods according to any one of A001 to A076, or any of the Embodiments.

E001. A vehicle comprising:

the computer program product according to C001, C011, or any one of the Embodiments;

the computer readable storage medium according to D001, D011, or any one of the Embodiments; or the system according to any of B001 to A076, or any one of the Embodiments.

E002. The vehicle of E001, further comprising:
a movable wireless repeater; and/or
a device to be left behind the vehicle.

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof.

A group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

With respect to the use of substantially any plural and/or singular terms herein in the English language, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality.

Any of the embodiments or any of the aspects disclosed herein is independently combinable, partly or wholly with other embodiments described herein in any way, e.g., one, two, or three or more embodiments may be combinable in whole or in part.

Further, any of the features of any of the embodiments or any of the aspects disclosed herein is applicable to any of the other embodiments and aspects, or may be made optional to other embodiments or aspects.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions may now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of detecting a status of a user outside a vehicle, the method comprising:
establishing a wireless connection between a user and a vehicle;
determining a status of the user away from the vehicle via the wireless connection; and
if the status includes an emergency of the user, causing the vehicle to transmit an emergency signal,
wherein the determining of the status of the user away from the vehicle via the wireless connection includes:
designating a time in which the user is expected to return to the vehicle; and
if the user has not returned to the vehicle by or at the designated time, determining the status as an emergency of the user, and
wherein the designating of the time includes designating the time by the user.

2. The method according to claim 1, further comprising:
communicating with a portable communication device of the user; and
acquiring the status of the user.

3. The method according to claim 2, wherein the status of the user to be acquired includes whether the communication can be established between the user and the vehicle.

4. The method according to claim 3, wherein the status of the user to be acquired includes at least one of a location of the user and a health condition of the user.

5. The method according to claim 1, further comprising guiding the user to input a plan of an activity to be done by the user.

6. The method according to claim 5, further comprising recording the plan of the activity of the user.

7. The method according to claim 1, further comprising providing a recipient of the emergency signal,
wherein the transmitting of the emergency signal includes transmitting the emergency signal to the recipient.

8. The method according to claim 1, wherein the transmitting of the emergency signal includes searching a usable communication network.

9. The method according to claim 1, wherein the transmitting of the emergency signal includes: if no usable communication network is found, causing the vehicle to autonomously move from an initial position to a location where a usable communication network exists.

10. The method according to claim 9, wherein causing the vehicle to autonomously move from the initial position to a location where a usable communication network exists includes leaving a device to be left behind at the initial position.

11. The method according to claim 10,
wherein the device to be left behind is capable of communicating with the user, and/or
wherein the device to be left behind is capable of communicating with the vehicle.

12. A method of detecting a status of a user outside a vehicle, the method comprising:
establishing a wireless connection between a portable communication device of a user and a vehicle;
communicating with the portable communication device of the user;
acquiring the status of the user;
determining a status of the user away from the vehicle via the wireless connection; and
if the status includes an emergency of the user, causing the vehicle to transmit an emergency signal, wherein the determining of the status of the user away from the vehicle via the wireless connection includes:

designating a time in which the user is expected to return to the vehicle; and if the user has not returned to the vehicle by or at the designated time, determining the status as an emergency of the user, and wherein the status of the user to be acquired includes at least one of a location of the user and a health condition of the user.

13. The method according to claim 12, further comprising starting to count the designated time when the user has gone outside of a communication range of a base station of the vehicle or when wireless communication between the user and the vehicle has been lost.

14. The method according to claim 12, further comprising acquiring the status of the user at a plurality of timings.

15. The method according to claim 12, wherein acquiring the status of the user includes acquiring the status of the user constantly or periodically.

16. A method of detecting a status of a user outside a vehicle, the method comprising:

establishing a wireless connection between a portable communication device of a user and a vehicle;

communicating with the portable communication device of the user;

acquiring the status of the user;

determining a status of the user away from the vehicle via the wireless connection; and if the status includes an emergency of the user, causing the vehicle to transmit an emergency signal, wherein the determining of the status of the user away from the vehicle via the wireless connection includes:

designating a time in which the user is expected to return to the vehicle; and if the user has not returned to the vehicle by or at the designated time, determining the status as an emergency of the user, wherein the status of the user to be acquired includes whether the communication can be established between the user and the vehicle, wherein the communicating with the user includes communicating with the user via a wireless repeater, the wireless repeater being capable of communicating both with the users and the vehicle, and wherein the wireless repeater is or built in a self-propelled device or a drone.

17. The method according to claim 16, wherein the wireless repeater is configured to go back and forth between the user and the vehicle to relay the status of the user to the vehicle.

18. The method according to claim 16, wherein the wireless repeater is configured to fly to a location where a communication network is available and transmit the status of the user to the communication network.

* * * * *